United States Patent [19]

Collins

[11] 4,161,823
[45] Jul. 24, 1979

[54] CIRCUMFERENCE MEASURING GAUGE
[75] Inventor: Terrence Collins, Whitburn, England
[73] Assignee: American Filtrona Corporation, Richmond, Va.
[21] Appl. No.: 867,448
[22] Filed: Jan. 6, 1978
[30] Foreign Application Priority Data
  Jan. 7, 1977 [GB] United Kingdom ............... 596/77
[51] Int. Cl.² ............................ G01B 3/10; G01B 5/08
[52] U.S. Cl. .......................................................... 33/179
[58] Field of Search .................... 33/179, 176, 178 R, 33/178 D

[56] References Cited
U.S. PATENT DOCUMENTS
2,609,610 9/1952 Elmes ..................................... 33/179
3,967,383 7/1976 Collins .................................... 33/179

Primary Examiner—Richard E. Aegerter
Assistant Examiner—Willis Little
Attorney, Agent, or Firm—Holman & Stern

[57] ABSTRACT

An improved circumference measuring device of the type comprising a tape curved to form a closed loop with the tape ends being attached to mounting members resiliently biased away from each other to tend to tighten the loop. A cam and follower system operates on one of the mounting members to move the mounting members closer together against the bias for insertion of a rod to be measured and then allow the mounting members to move apart to tighten the loop around the rod. Means responsive to the distance apart of the mounting members indicates the size of the loop and thus of the rod being measured and an automatic control system operates the cam so as cyclically to move the mounting members and adjust the loop between relaxed and rod-gripping and measuring conditions.

9 Claims, 7 Drawing Figures

CIRCUMFERENCE MEASURING GAUGE

BACKGROUND OF THE INVENTION

This invention relates to a circumference measuring gauge of the type which employs a tape curved over an intermediate portion into a closed loop with its two end portions extending away from the loop in opposite directions, two mounting members one fixed relative to each end portion of the tape and mounted for relative movement towards and away from one another to increase or decrease the loop circumference, and means responsive to the distance apart of two datum points one fixed relative to each mounting member to indicate the size of the loop.

U.S. Pat No. 3,967,383 describes such measuring gauges and their operation, and also illustrates the cassette form in which the tape is preferably provided, with its said end portions firmly affixed to respective separate plates which have inwardly directed end portions extending arcuately towards one another around the portion of the circumference of the loop. A particular embodiment of this prior patent comprises in combination a tape including an intermediate portion forming means defining a closed loop with its two end portions extending away from the loop in opposite directions, two mounting members, one fixed relative to each end portion of said tape and mounted for relative movement towards and away from one another in increase or decrease the loop circumference, and means responsive to the distance apart of two datum points, one fixed relative to each mounting member to indicate the size of said loop, means resiliently biasing said mounting members away from each other to tighten said loop, cam means comprising a generally annular body having an inner peripheral cam surface, cam follower means including at least one cam follower member attached to a movable mounting member and operatively engaging said cam surface, said cam means being rotatable and said cam surface having first portions which, when engaged by said cam follower means, moves said mounting members towards each other against said resilient bias to loosen said loop for acceptance or release of a rod to be measured, and second portions which permit said resilient bias to move said mounting members away from each other to tighten said loop around a rod to be measured, motor means operatively associated with said cam means to rotate said cam means, and control means for actuating and deactuating said motor means for rotating and stopping rotation of said cam means, said control means including means for actuating said motor means to rotate said cam means to a first position in which said cam follower means engage said first portions of said cam surface and said loop is at its maximum circumference, means to deactuate said motor means in said first position to permit insertion of a rod to be measured into said loop, means to again actuate said motor means after the rod to be measured is inserted into said loop to rotate said cam means to a second position in which said cam follower means is juxtaposed to said second portions of said cam surface to permit said resilient bias to tighten said loop around the rod to be measured, means to deactuate said motor means in said second position to allow measurement, and means to again actuate said motor means to rotate said cam means to a third position in which the loop is loosened, means to deactuate said motor means in said third position to permit removal from said loop of the rod that has been measured, said means for actuating said motor means to rotate said cam means to said first position being activated on removal of the rod that has been measured from said loop.

BRIEF SUMMARY OF THE INVENTION

It is an object of this invention to improve and simplify the automatic cycle of operation for such gauges. This is achieved, according to the invention, in a measuring gauge comprising, in combination: a tape including an intermediate portion forming means defining a closed loop with its two end portions extending away from the loop in opposite directions; two mounting members, one fixed relative to each end portion of said tape, one mounting member being fixed and the other being mounted for movement towards and away from said one member to increase or decrease the loop circumference; means responsive to the distance apart of two datum points, one fixed relative to each of said mounting members, to indicate the size of said loop; means resiliently biasing said other mounting member away from said one mounting member to tighten said loop; cam means having a cam surface; a cam follower attached to said other mounting member in operative relationship with said cam surface; means mounting said cam means for rotation with said cam surface and cam follower in engagement successively and alternately to move said other mounting member towards said one mounting member against said resilient bias to relax said loop for acceptance or release of a test rod and then to permit said resilient bias to move said other mounting member away from said one mounting member to tighten said loop around a test rod disposed therethrough; motor means operatively associated with said cam means to effect said rotation of said cam means; and control means operable to actuate and deactuate said motor means in a measuring cycle, said control means comprising first sensing and actuating means operative to sense insertion of a test rod through said loop when relaxed and thereupon to actuate said motor means to rotate said cam means from a start position in which said cam surface engages said cam follower to maintain said loop relaxed against said resilient bias to an intermediate position in which said loop is tightened around said test rod under said resilient bias, second sensing and actuating means operative to sense said cam means in said intermediate position and thereupon to deactuate said motor and actuate a timing means, said timing means being operative after a predetermined measuring interval to reactuate said motor means to rotate said cam means directly to said start position, to relax said loop and release said test rod, and third sensing and deactuating means operative to sense said rod release and thereupon to deactuate said motor with said cam means in said start position.

BRIEF DESCRIPTION OF THE DRAWINGS

An embodiment of a gauge, according to the present invention, is described below, by way of example only, with reference to the accompanying drawings in which.

Figure 1:
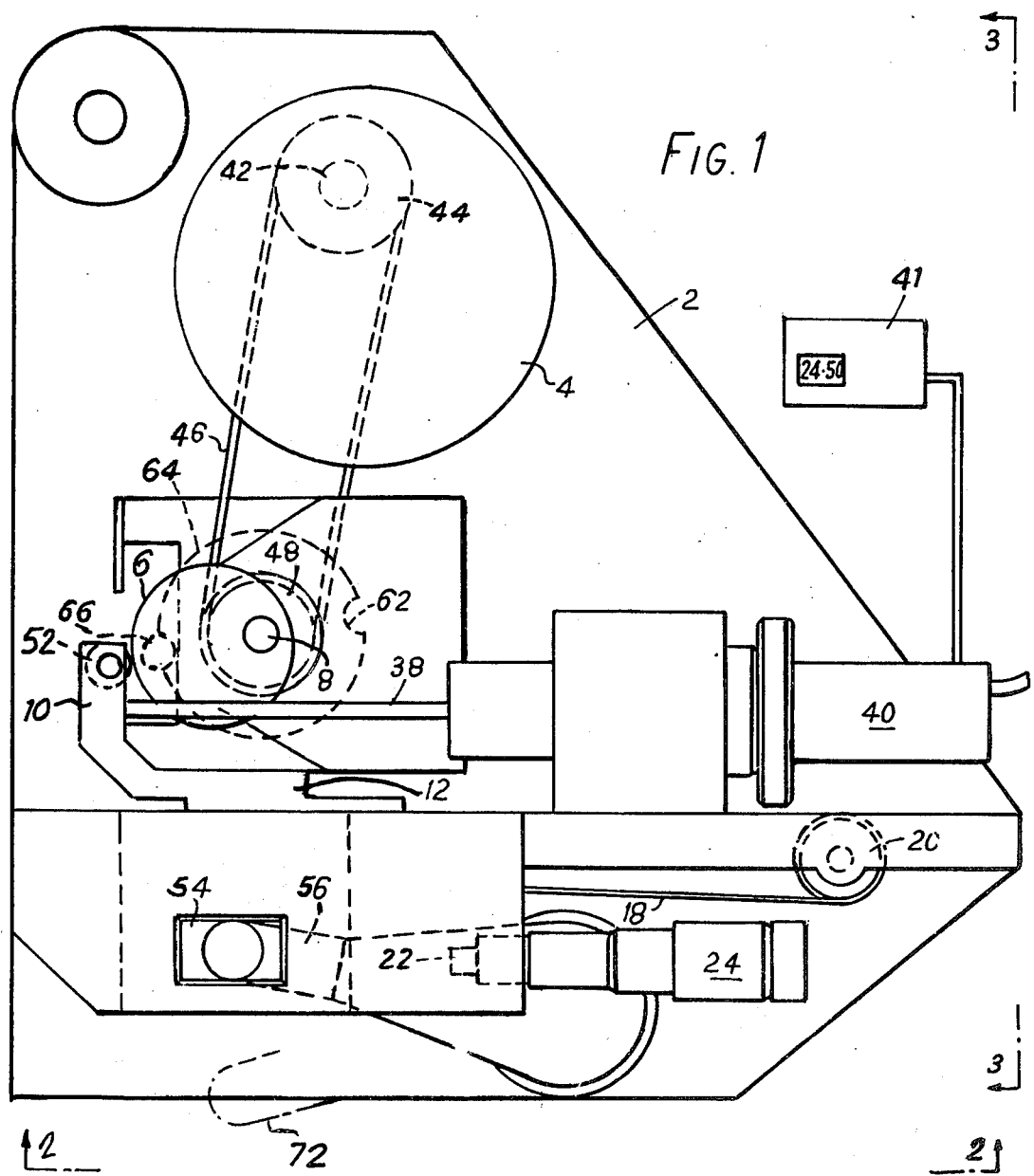
FIG. 1 is a plan view of the gauge.
Figure 2:
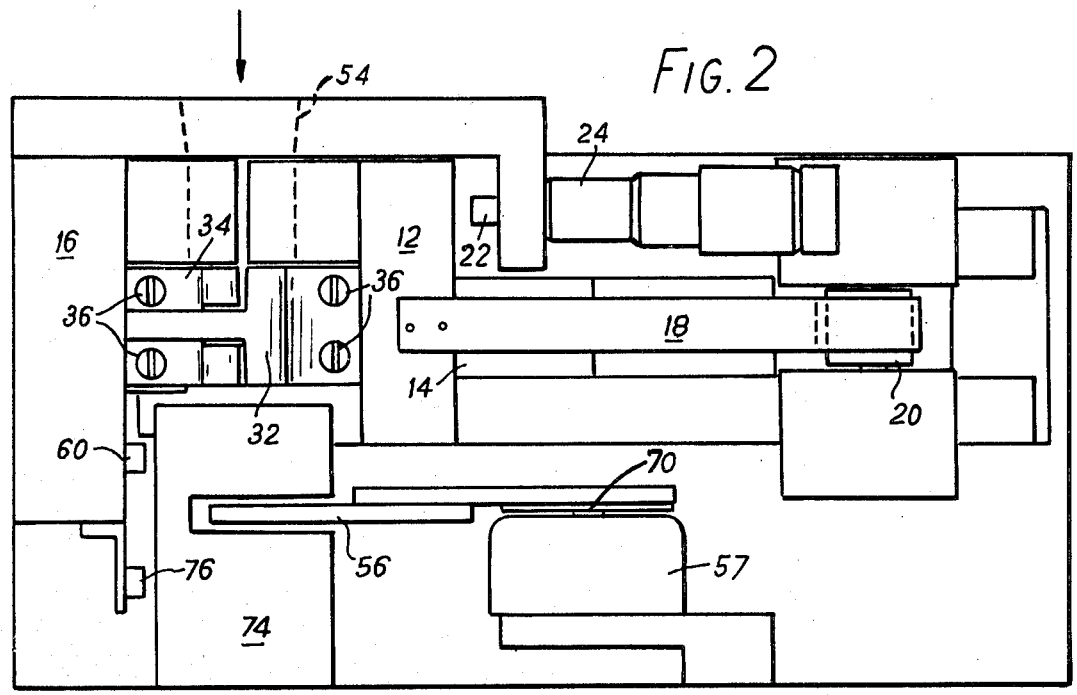
FIG. 2 is an elevation view along the lines 2—2 of FIG. 1.
Figure 3:
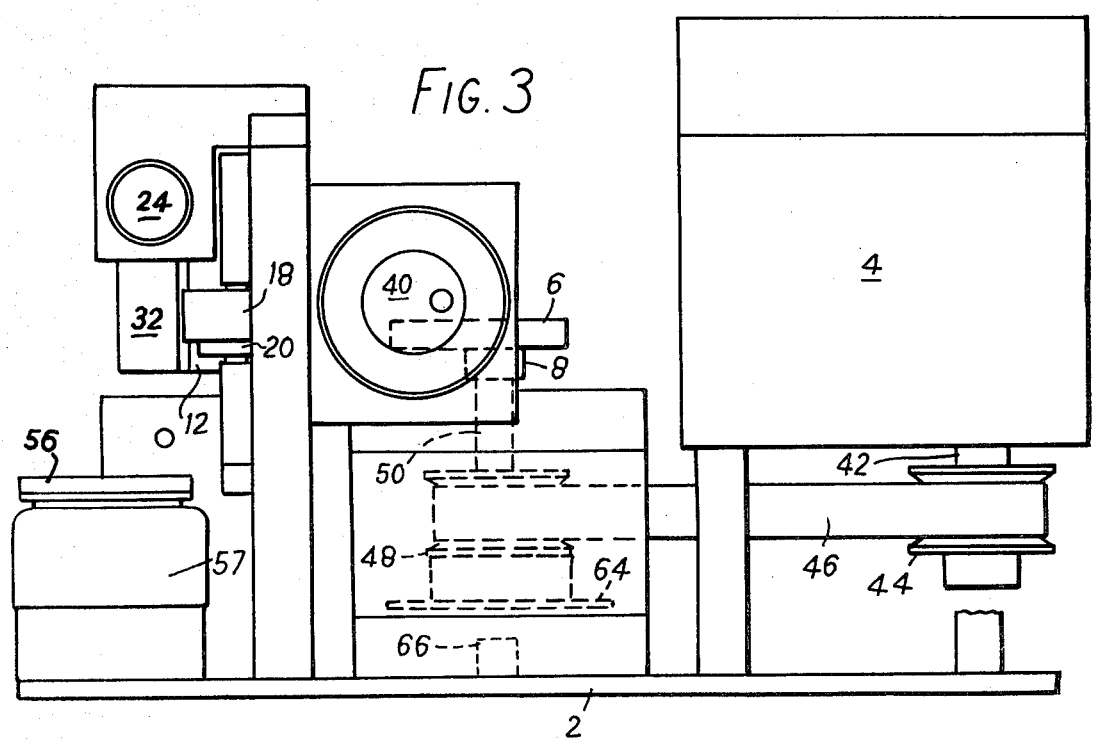
FIG. 3 is an elevation view along the lines 3—3 of FIG. 1.
Figure 4:
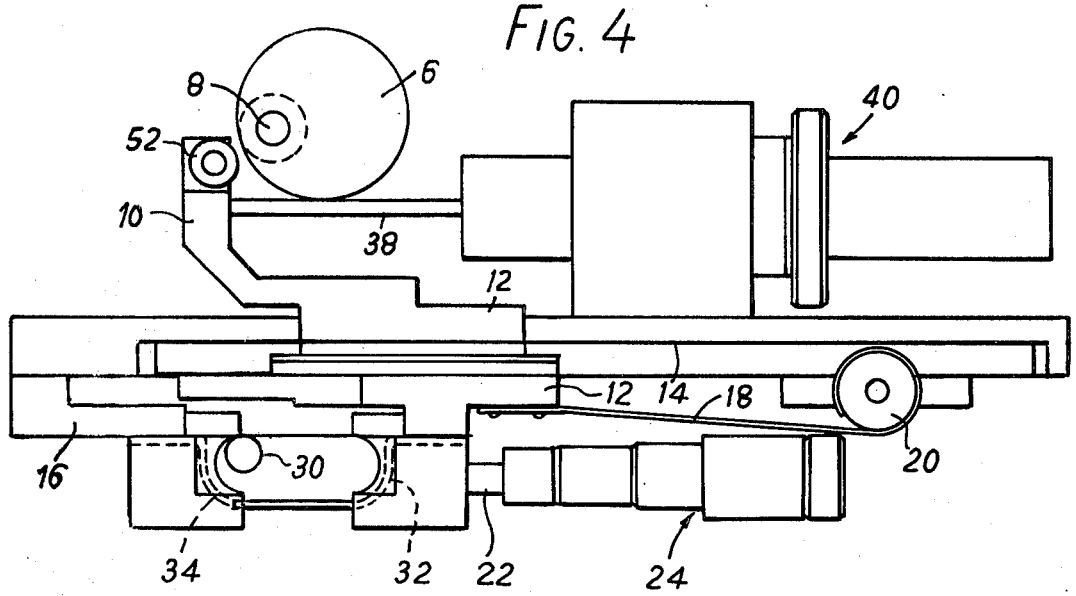
FIG. 4 is a plan view of part of the gauge with the tape in a measuring position.
Figure 5:
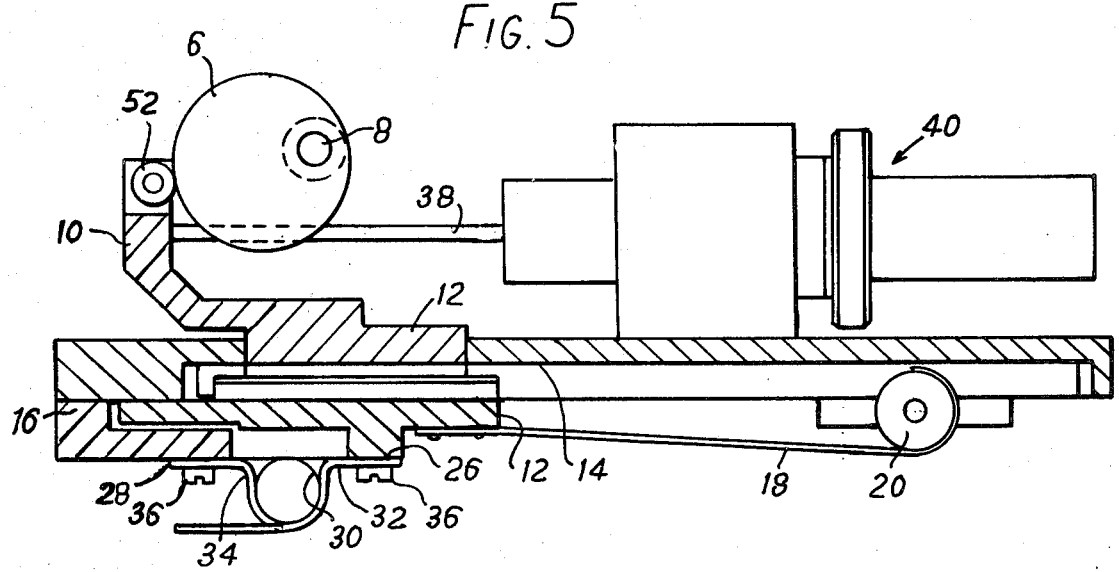
FIG. 5 is a plan view, partly in section, similar to FIG. 4 but showing the tape in a position for accepting or releasing a rod to be measured.

The gauge shown in FIGS. 1 to 5 of the drawings has a base 2 on which is mounted an electric motor 4 which drives a cam 6 constituted by a circular metal disc eccentrically mounted at 8. In its rotation cam 6 acts on an arm 10 of a slide member 12 which is free to slide in slideway 14 towards and away from fixed member 16. Slide member 12 is constantly pulled resiliently away from fixed member 16 (i.e., to the right in FIGS. 2, 4 and 5), by a spring 18 attached at one end to the slide member 12 and at the other to a member 20 fixed to the slideway 14. Movement of the slide member 12 away from fixed member 16 is limited by a stop 22 whose position can be adjusted accurately by micrometer 24. Secured to adjacent level faces 26 and 28 of the slide member 12 and fixed member 16 as best seen in FIG. 5, are the respective end portions of a looped tape 30 of the type mentioned above, i.e., a tape curved over its intermediate portion into a closed loop with its end portions extending away from the loop in opposite directions; the tape preferably has an aperture, and a tongue formed at one end, the tongue being threaded through the aperture to form the loop. The ends of the tape 30 are sandwiched between the faces 26, 28 and respective plates 32, 34, the latter as illustrated having co-operating arcuate extensions which extend around the loop and serve to protect and guide it. For full details of a suitable looped tape and protecting plates, attention is directed to the above-mentioned U.S. Pat. No. 3,967,383, and especially to FIGS. 1, 2 and 7 and the accompanying description thereof. The plates 32 and 34 are secured to members 12 and 16 by bolts or screws 36. It will thus be seen that on movement of the slide member 12 away from and towards fixed member 16, the loop in tape 30 will be respectively tightened and relaxed. In its movement with slide member 12, the arm 10 operates spring-loaded plunger 38 of a linear transducer 40 connected by conventional circuitry as indicated in FIG. 1 to a meter, which may be the display panel of a microprocessor 41 and which gives, at least in the measuring interval, a reading indicative of the position of arm 10 of slide member 12 and hence indicative of the diameter of the loop in tape 30. Longitudinal movement of plunger 38 produces a linear change in the voltage output from transducer 40. As indicated above, the movement of slide member 12 away from fixed member 16, and hence the minimum diameter to which the loop can be constricted, is restricted by the adjustable stop 22. Movement of the slide member 12 towards fixed member 16 to increase the diameter of the loop 30, is effected by rotation of the cam 6 (clockwise when seen in top plan view) from the position shown in FIG. 4 to that shown in FIG. 5. The cam 6 is driven by electric motor 4 by way of shaft 42, pulley 44, belt 46, pulley 48 and shaft 50, and on clockwise rotation in the manner indicated its cylindrical periphery comes into contact with rotary bearing member 52 on the end of arm 10 and with continued rotation pushes this arm and hence slide member 12 to the left (as seen in FIGS. 4 and 5) against the action of spring 18, bringing the loop 30 to its maximum diameter as seen in FIG. 5. On further rotation of the cam from the FIG. 5 towards the FIG. 4 position the arm 10 and slide 12 are drawn down controlledly to the right under action of spring 18 until the slide member abuts against stop 22.

For a measuring operation, e.g., on a cigarette filter rod, the rod is inserted axially through the loop 30 when the latter is near or at its miximum diameter as in FIG. 5, and the cam 6 is then rotated clockwise by motor 4, slide member 12 then moving away from fixed member 16 under the action of spring 18 until the loop 30 encircles the rod firmly. As explained above, the reading on the meter connected to linear transducer 40 will then be indicative of the diameter of the loop and hence of the diameter of circumference of the rod that it encircles; the meter can be calibrated to give a direct reading of diameter or circumference, or to indicate variations of either of these from a predetermined norm. Further clockwise rotation of the cam from the FIG. 4 towards the FIG. 5 position relaxes the loop 30 so that the test rod is released for removal. The tension in spring 18 is constant and selected to ensure that it does not draw the loop 30 too tightly around the rods to be tested, i.e., sufficiently tightly to constrict the rods and hence result in an inaccurate reading of their size.

In the preferred embodiment of the gauge illustrated in the accompanying drawings, the measuring cycle is initiated and effected automatically. At the start of the cycle, the gauge is in the condition indicated in FIG. 5, with the loop 30 at its maximum diameter. In this condition, the gauge is ready to accept a rod for measurement. A rod to be measured is dropped axially through funnel 54 to rest temporarily on plate 56, the rod in this position extending axially through the loop 30. In this position, the rod intercepts a beam to photoelectric cell 60, and this switches on motor 4 which drives cam 6 clockwise from the FIG. 5 towards the FIG. 4 position, so that with movement of slide 12 under action of spring 18 the loop 30 is reduced until it fits firmly around the rod under test. The rotation of the cam 6 is stopped automatically in the FIG. 4 position when a notch 62 (FIG. 1) in the periphery of a flange 64 secured to pulley 48 comes opposite a photoelectric cell 66 so as to allow the cell to be activated by a beam. Activation of cell 66 also switches on a timer (not shown) which again switches on motor 4 after a predetermined time interval long enough for the recordal of the measurement of the test rod diameter or circumference. After this predetermined interval, the cam 6 thus continues its rotation back towards the FIG. 5 position so that the loop diameter increases to release the rod. The timer also actuates a mechanism 57 which momentarily kicks plate 56 (which is pivoted at 70) out from under the test rod to the position indicated in dotted lines at 72 in FIG. 1, so that the measured rod drops out of the gauge under its own weight through the hollow tube 74. As it drops, the rod intercepts a beam to photocell 76, and this automatically deactivates the motor. The plate 56 returns immediately to its position blocking the passage through funnel 54, the looped tape 30, and hollow tube 74, so that the gauge at this juncture is substantially in the position indicated by FIG. 5, ready to start a new measuring cycle which will be initiated as soon as a fresh rod is fed through funnel 54 so as to cause photocell 60 to actuate the motor 4.

Figure 6:
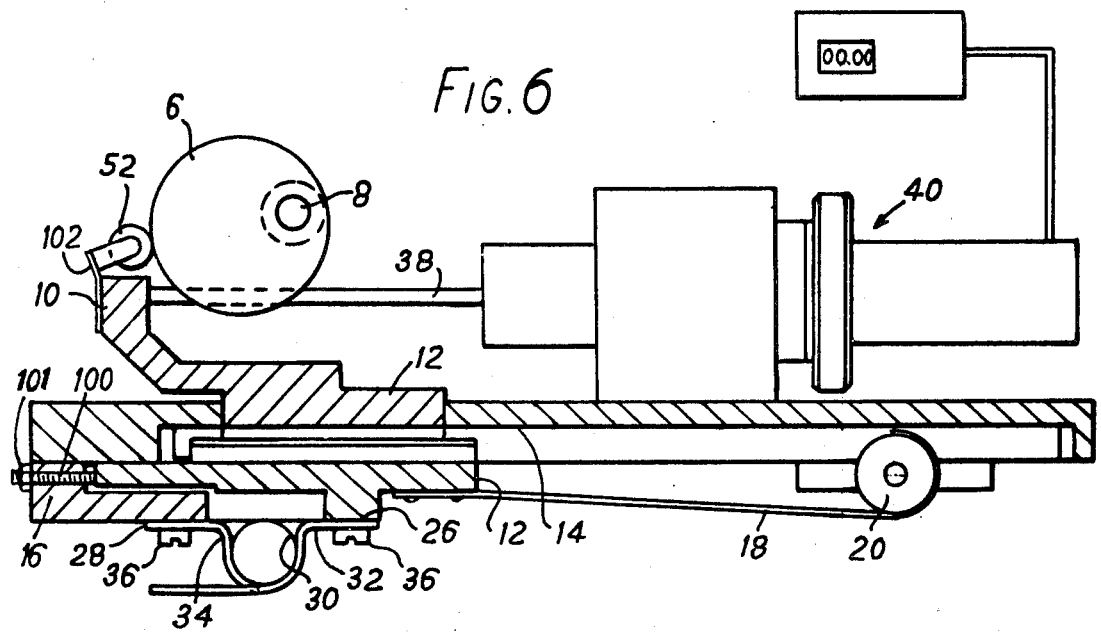
FIG. 6 is a plan view, similar to that of FIG. 5 showing parts of a modified gauge.

FIG. 6 illustrates preferred modifications of a gauge which is otherwise as shown in FIGS. 1 to 5 and in which the transducer feeds its output to a microprocessor 41 for assessment and display of test rod size. For optimum accuracy with such an arrangement it is essential to establish a precise fixed datum line. To this end, as shown in FIG. 6, a stop 100 is provided, mounted firmly on member 16, to limit movement of slide 12 and its arm 10 towards member 16, and rotary bearing member 52 is resiliently mounted on arm 10 by spring mounting 102; cam 6 can thus be rotated to move arm 10 into precise and firm abutment with stop 100, resilient mounting 102 ensuring that there is no zeroing error due e.g., to play of member 52 on its mounting, and the transducer output in this position thus provides a reliable and precise datum line as the basis for subsequent calibration and measurement. Stop 100, in the form of a rod, can be adjusted longitudinally to alter the datum line by means of nut 101 with which it is threadedly engaged.

Figure 7:
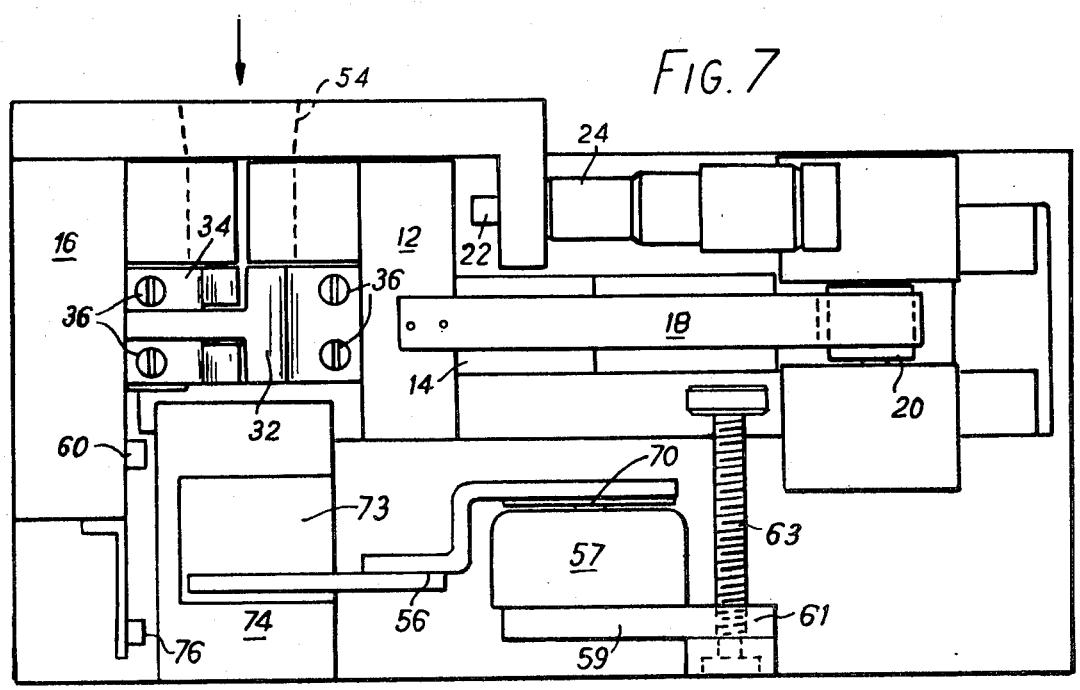
FIG. 7 is an elevation view, similar to that of FIG. 2, showing a preferred feature which may be employed in the gauges of FIGS. 1 to 6.

FIG. 7 shows a gauge in which the plate 56 is vertically adjustable.

Plate 56 in this instance is of cranked configuration, and the plate, pivot 70 and mechanism 57 are carried on a member 59 which is threadedly engaged at 61 with a screw-threaded jack 63. By operation of jack 63 plate 56 may thus be moved up or down to accommodate different lengths of test rod, permitting them to be measured always at the same regions along their length (e.g., at their mid-point) and thus improving the reliability and comparability of the measurement results. Apart from these changes in plate 56 and its mounting, the increase in the vertical height of the gap 73 in tube 74, and the lowering (if necessary) of the position of photocell 76 so that it is below the lowermost level of plate 56, the apparatus of FIG. 7 is the same as that of FIGS. 1 to 5 or FIG. 6.

It will be understood that, although it is particularly advantageous to employ the looped tape in the form suggested above with a tongue at one end threaded through an aperture to form the loop, the tape could instead be wound into a spiral loop. Similarly, whilst the use of protecting and guiding plates such as indicated at 32 and 34 in the accompanying drawings, and such as illustrated in and described with reference to FIG. 7 of U.S. Pat. No. 3,967,383, is particularly advantageous, this is not essential. The feature of the rod to be tested being fed into and then dispensed from the gauge under its own weight is also a convenience, but the orientation of the relevant parts of the gauge can of course be altered, if this should be more appropriate for any particular application, so that the rods under test have to be positively fed in and/or positively withdrawn from the gauging head portion of the apparatus. The use of photocells as described above to facilitate automatic operation of a measuring cycle is particularly convenient, but once again other means might be used for automatically initiating and terminating the measuring cycle and for timing the intermediate delay whilst measurement is taken and effecting discharge of the measured rod. The simple cam system described above with reference to the drawings is particularly elegant and effective, especially when taken in conjunction with means such as the described photocell and timer arrangement, for operation of a measuring cycle.

The embodiments of the invention in which an exclusive property or privilege is claimed are defined as follows:

1. A measuring gauge comprising, in combination:
   a tape including an intermediate portion forming means defining a closed loop with its two end portions extending away from the loop in opposite directions;
   two mounting members, one fixed relative to each end portion of said tape, one mounting member being fixed and the other being mounted for movement towards and away from the said one member to increase or decrease the loop circumference;
   means responsive to the distance apart of two datum points, one fixed relative to each mounting member, to indicate the size of said loop;
   means resiliently biasing said other mounting member away from said one mounting member to tighten said loop;
   cam means having a cam surface;
   a cam follower attached to said other mounting member in operative relationship with said cam surface;
   means mounting said cam means for rotation with said cam surface and cam follower in engagement successively and alternately to move said other mounting member towards said one mounting member against said resilient bias to relax said loop for acceptance or release of a test rod and then to permit said resilient bias to move said other mounting member away from said one mounting member to tighten said loop around a test rod disposed therethough;
   motor means operatively associated with said cam means to effect said rotation of said cam means, and
   control means operable to actuate and deactuate said motor means in a measuring cycle, said control means comprising first sensing and actuating means operative to sense insertion of a test rod through said loop when relaxed and thereupon to actuate said motor means to rotate said cam means from a start position in which said cam surface engages said cam follower to maintain said loop relaxed against said resilient bias to an intermediate position in which said loop is tightened around said test rod under said resilient bias, second sensing and actuating means operative to sense said cam means in said intermediate position and thereupon to deactuate said motor and actuate a timing means, said timing means being operative after a predetermined measuring interval to reactuate said motor means to rotate said cam means directly to said start position, to relax said loop and release said test rod, and third sensing and deactuating means operative to sense the release of said rod and thereupon to deactuate said motor with said cam means in said start position.

2. A measuring gauge as claimed in claim 1 including means mounting said loop with its longitudinal axis upright, and a plate mounted below said loop to receive and support a test rod disposed through said loop.

3. A measuring gauge as claimed in claim 2 including means mounting said plate for movement to and from a rod receiving position below said loop, and means for effecting said movement from said rod receiving position, said timing means being operative after said predetermined measuring interval also to actuate said plate moving means to allow a measured test rod to drop through and clear of said loop.

4. A measuring gauge as claimed in claim 3 wherein said third sensing and deactuating means comprises means for sensing a test rod dropping from said loop and past said plate and thereupon deactuating said motor means.

5. A measuring gauge as claimed in claim 2 wherein said plate is vertically adjustable.

6. A measuring gauge as claimed in claim 1 including an adjustable stop member limiting movement of said other mounting member away from said one mounting member.

7. A measuring gauge as claimed in claim 1 wherein said cam means comprises an eccentrically mounted disc.

8. A measuring gauge as claimed in claim 1 wherein said cam follower is resiliently mounted on said other mounting member.

9. A measuring gauge as claimed in claim 1 wherein said means responsive to the distance apart of said two datum points to indicate the size of said loop comprises a linear transducer operatively associated with said other mounting member and a microprocessor electrically connected to said transducer to produce in said measuring interval a reading of loop size according to the position of said other mounting member, said gauge including a stop limiting movement of said other mounting member towards said one mounting member so to define one said datum point, and said cam follower being resiliently mounted on said other mounting member.

* * * * *